United States Patent [19]

O'Connor et al.

[11] Patent Number: 4,458,426

[45] Date of Patent: Jul. 10, 1984

[54] GYROSCOPIC APPARATUS

[75] Inventors: Bernard J. O'Connor, Eastchester, N.Y.; Joseph P. Pierry, Park Ridge; Michael J. Lanni, Ridgewood, both of N.J.

[73] Assignee: The Bendix Corporation, Teterboro, N.J.

[21] Appl. No.: 361,709

[22] Filed: Mar. 25, 1982

[51] Int. Cl.³ .................................. G01C 19/38
[52] U.S. Cl. ................................. 33/325; 33/326
[58] Field of Search ............... 33/323, 324, 325, 326, 33/354

[56] References Cited

U.S. PATENT DOCUMENTS

| | | | |
|---|---|---|---|
| 2,677,194 | 5/1954 | Bishop | 33/325 |
| 3,292,269 | 12/1966 | Brugger | 33/324 |
| 3,329,028 | 7/1967 | Schaffer | 33/323 |
| 3,813,788 | 6/1974 | Johnston | 33/323 |
| 4,158,261 | 6/1979 | Auer | 33/324 |

FOREIGN PATENT DOCUMENTS 2090973 7/1982 United Kingdom ............... 33/324

*Primary Examiner*—Richard R. Stearns
*Attorney, Agent, or Firm*—Anthony F. Cuoco; Thomas L. Adams

[57] ABSTRACT

A gyrocompass has a gimbal (18;218) rotatable about an upright axis (22;222) and a gyro (10;210) rotatably mounted in this gimbal (18;218) about an inner axis (16;216) transverse to the upright axis (22;222). The gyrocompass also includes a level sensor (30,32;230,232) supported by the gimbal (18;218) for providing a level signal signifying the tilt of the upright axis (22;222) from vertical. Also included is a controller (50) connected to the level sensor (30,32;230,232). The controller (50) includes equipment responsive to the level signal for rotating the gimbal (18;218) into an initial position (SP(1)) at which the level signal has a predetermined value. A method employing the foregoing apparatus includes the steps of rotating the gimbal (18;218) until the level sensor (30,32;230,232) indicates the inner axis (16;216) is horizontal. Another step is measuring the torque applied to the gyroscope (10;210) by the horizontal component of rotation of the earth with the spin axis (SA1;SA) of the gyroscope (10;210) rotated about the inner axis (16;216) into a horizontal position. Other steps are rotating the gimbal (18;218) 180 degrees and remeasuring the torque applied to the gyroscope (10;210) by the horizontal component of rotation of the earth with the spin axis (SA1;SA) of the gyroscope (10;210) rotated about the inner axis (16;216) into a horizontal position.

21 Claims, 5 Drawing Figures

GYROSCOPIC APPARATUS

BACKGROUND OF THE INVENTION

The present invention relates to gyrocompasses and, in particular, to a gyro mounted in a gimbal which is rotatable about an upright axis.

It is known to employ a gyrocompass mounted in an azimuthally rotatable gimbal. These systems typically employ two gimbals outside of the azimuth gimbal which serve to keep the axis of the latter vertical. An error arises when this axis is tilted because of the mixing of the vertical component of the earth's rotation with the horizontal component. Known gyrocompasses employ a gyroscope rotatably mounted in a gyro case with a single degree of freedom about an output axis transverse to the spin axis of the gyroscope. These known gyroscopes rely on the fact that the component of rotation of the earth orthogonal to both the output axis and spin axis of the gyroscope produces a torque about the output axis. This torque can be measured and used to determine the direction of north.

It is also known to use a single gyroscope in both a gyrocompass and directional mode. This known dual function gryoscope is initially aligned with its input axis horizontal to sense the earth's horizontal component of rotation. Subsequently, the input axis is rotated 90 degrees into a vertical position where the gyrscope can determine the direction (azimuthal rotation) of a vehicle supporting the gyroscope.

A disadvantage with some of the foregoing gyroscopic systems is the relative complexity and the need for many gimbals. Therefore, it is an object of the present invention to provide an improved gyrocompass which is simple yet accurate.

SUMMARY OF THE INVENTION

In accordance with the illustrative embodiments demonstrating features and advantages of the present invention, there is provided a gyrocompass having a gimbal rotatable about an upright axis and a gyro. The gyro is rotatably mounted in the gimbal about an inner axis transverse to the upright axis. Also included is a level sensing means supported by the gimbal for providing a level signal signifying the tilt of the upright axis from vertical. A control means is included which is connected to the level sensing means. The control means includes means responsive to the level signal for rotating the gimbal into an initial position at which the level signal has a predetermined value.

A related method according to the same invention uses a level sensor mounted on a gimbal rotatably supporting a gyroscope about an inner axis. The method includes the step of rotating the gimbal until the level sensor indicates the inner axis is horizontal. Another step is measuring the torque applied to the gyroscope by a horizontal component of rotation of the earth, with the spin axis of the gyroscope rotated about the inner axis into a horizontal position. The method also includes the steps of rotating the gimbal 180 degrees and remeasuring the torque applied to the gyroscope by the horizontal component of rotation of the earth, with the spin axis of the gyroscope rotated about the inner axis into a horizontal position.

By employing such apparatus and methods, an improved gyrocompass is provided where an azimuthally rotatable gimbal need not have outer gimbals merely for the purpose of keeping the axis of azimuthal rotation vertical. The preferred embodiment employs a level sensor on a gimbal that supports the gyroscope case but allows the case to rotate about an axis transverse to the axis of rotation of the gimbal itself. The level sensor senses tilting of the axis of rotation of the gimbal. Initially the gimbal is rotated so that the inner axis and preferably the input axis of the gyroscope rotate through the same inclined plane until the input axis is horizontal. At this point, the gyrocompass reading is a direct measure of the horizontal component of the earth's rotation. Subsequently, the gimbal is rotated 180° so that the input axis of the gyroscope is again horizontal and another reading is taken. These two readings can be used to obtain an estimate of the direction to north. Subsequently, the gimbal may be again rotated to resolve ambiguities unresolved by the foregoing measurements. The reading from the gyroscope in this third position is then applied to a formula to determine with reasonable accuracy the direction to north.

This preferred embodiment employs a level sensor mounted on the gyroscope case to indicate and to control the case rotation within the gimbal and keep the spin axis of the gyroscope horizontal. Also in the preferred embodiment, the gimbals and the gyroscope are controlled by a microprocessor which sequences the gyroscope movement and applies the data attained thereby to predetermined formulas.

In this preferred embodiment, an additional gyroscope is mounted on the gimbal to move with the previously mentioned gyroscope. This added gryoscope is used primarily for the direction sensing mode and therefore has a vertical input axis. However, in another preferred embodiment, the gyrocompass is operated in two modes. The gyrocompass is mounted to allow its input axis to rotate 90 degrees and allow it to act initially as a gyrocompass and subsequently as a directional gyro.

In another preferred embodiment, a single two degree of freedom gyro is used to provide the two modes of operation otherwise provided by separate gyros.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings wherein.

DETAILED DESCRIPTION OF THE PREFERRED EMBODIMENT

Figure 1:
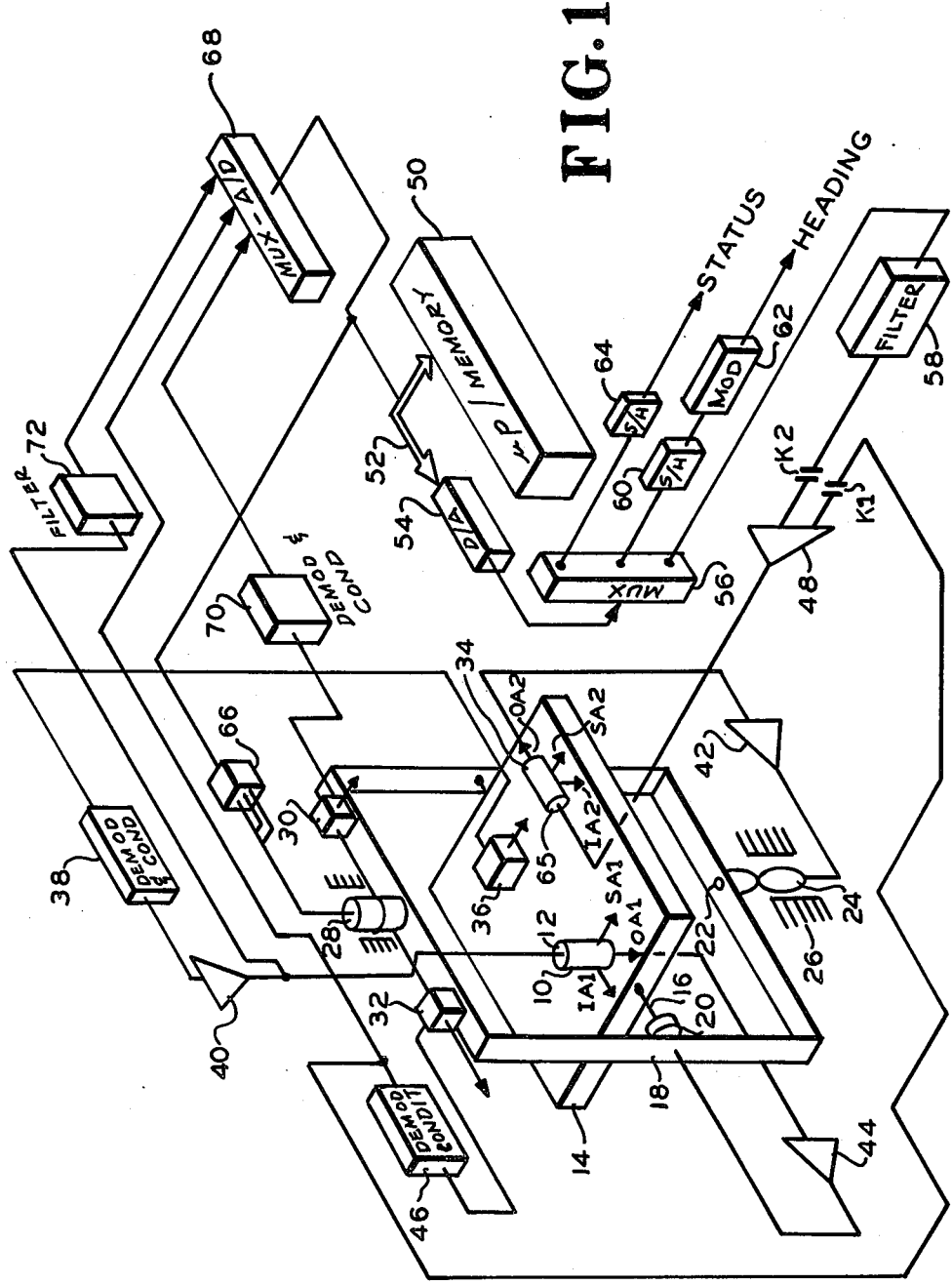
FIG. 1 is a schematic diagram showing a gyrocompass according to the principles of the present invention.

Referring to FIG. 1, a gyrocompass is shown employing a gyro 10. In this embodiment, gyro 10 is a single degree of freedom gyroscope having a spin axis SA1. Gyroscope 10 includes an output transducer for sensing rotation of spin axis SA1 about output axis OA1 and for producing a signal on the colinear lead also identified as line OA1. Gyroscope 10 also employs a torquer 12 which can apply a torque to the spinning element within gyroscope 10 and cause spin axis SA1 to rotate about output axis OA1. For well understood reasons, gyro 10 has an input axis orthogonal to both spin axis SA1 and the output axis OA1 as indicated by vector IA1. Gyroscope 10 is schematically illustrated on a platform 14 shown rotatably mounted along an inner axis 16 to a gimbal 18. In a practical embodiment, the gimbal platform will be structured differently. An inner torquing means is shown herein as torquer 20, which can cause rotation of platform 14 and thus gyroscope 10 about inner axis 16 with respect to gimbal 18. Gimbal 18 is rotatable about an upright axis shown herein as a pivot 22. Gimbal 18 can be rotated about pivot 22 by means of a gimbal torquing means shown herein as motor 24. Motor 24 is mounted within a larger carrier 26. Gimbal 18 is also shown pivotally supported through an upper synchro 28 which can produce a signal indicating the angular rotation of gimbal 18 about the upright axis of pivot 22.

Mounted on gimbal 18 is a level sensing means shown herein as a pair of level transducers 30 and 32, for indicating the extent of tilting of the upright axis of pivot 22 from vertical. Transducers 30 and 32 respond to tilting of the upright axis of gimbal 18 about two orthogonal axes, one parallel to inner axis 16 and one perpendicular thereto, respectively.

Also mounted on platform 14 is optional directional gyroscope 34 having an output axis OA2 parallel to inner axis 16 and having a spin axis SA2 nominally parallel to spin axis SA1. Input axis IA2 of gyroscope 34 is nominally parallel to the upright axis of pivot 22 so that gyroscope 34 can act as a directional gyroscope.

It will be appreciated that pivot 22 has an upright axis in the sense that it generally extends upwardly. However an upright axis in this context need not be perfectly vertical and may make an acute angle with true vertical.

Lever sensor 36, shown schematically mounted on platform 14, indicates the deflection of the spin axes SA1 and SA2 from horizontal about inner axis 16 (also the tilting of axes OA1 and IA2). Level sensor 36 is shown connected to a demodulator/conditioning circuit 38 which drives scaling amplifier 40 whose output connects to torquer 12 of gyro 10. Gyroscope 34 also has an output transducer OA2 (identifying numeral same as output axis) which drives scaling amplifier 42 whose output drives gimbal motor 24. Similarly, output transducer OA1 of gyroscope 10 drives scaling amplifier 44 which drives torquer 20 to rotate platform 14 about inner axis 16.

Level sensor 32 senses the tilting of inner axis 16 from horizontal and drives demodulator/conditioning circuit 46. Its output is connected to switching contacts K1 which can connect through to one input of the amplifier 48.

A control means is shown herein employing a microprocessor and memory system 50. System 50 connects through bus line 52 to digital to analog converter 54 to feed multiplexer 56. Multiplexer 56 provides analog output signals to signal conditioner circuit 58 whose output connects to switching contacts K2 which can switch through to a separate input of the amplifier 48. The output of amplifier 48 connects to torquer 65 in gyroscope 34 (similar to torquer 12). Contacts K1 and K2 can be operated manually or, preferably, by microcomputer 50. Multiplexer 56 can also provide an output to sample and hold circuit 60 whose output drives a modulator 62 to provide information to a heading indicator (not shown) for displaying the direction of the vehicle containing this apparatus. Additional output data from microprocessor 50 is coupled through multiplexer 56 to sample and hold circuit 64 to indicate the status of various operational parameters of the apparatus of FIG. 1.

Synchro to digital converter 66 receives input data from synchro transmitter 28 and conveys this data to bus line 52 so that microcomputer 50 receives data indicating the angular rotation of gimbal 18 about the upright axis of pivot 22. The output of multiplexer 68 also connects to bus line 52. The inputs of multiplexer 68 are signals from demodulator and conditioning circuits 70 and 46 and filter 72, the latter driven by amplifier 40. Circuit 70 is driven by the output of level sensor 30.

Figure 2:
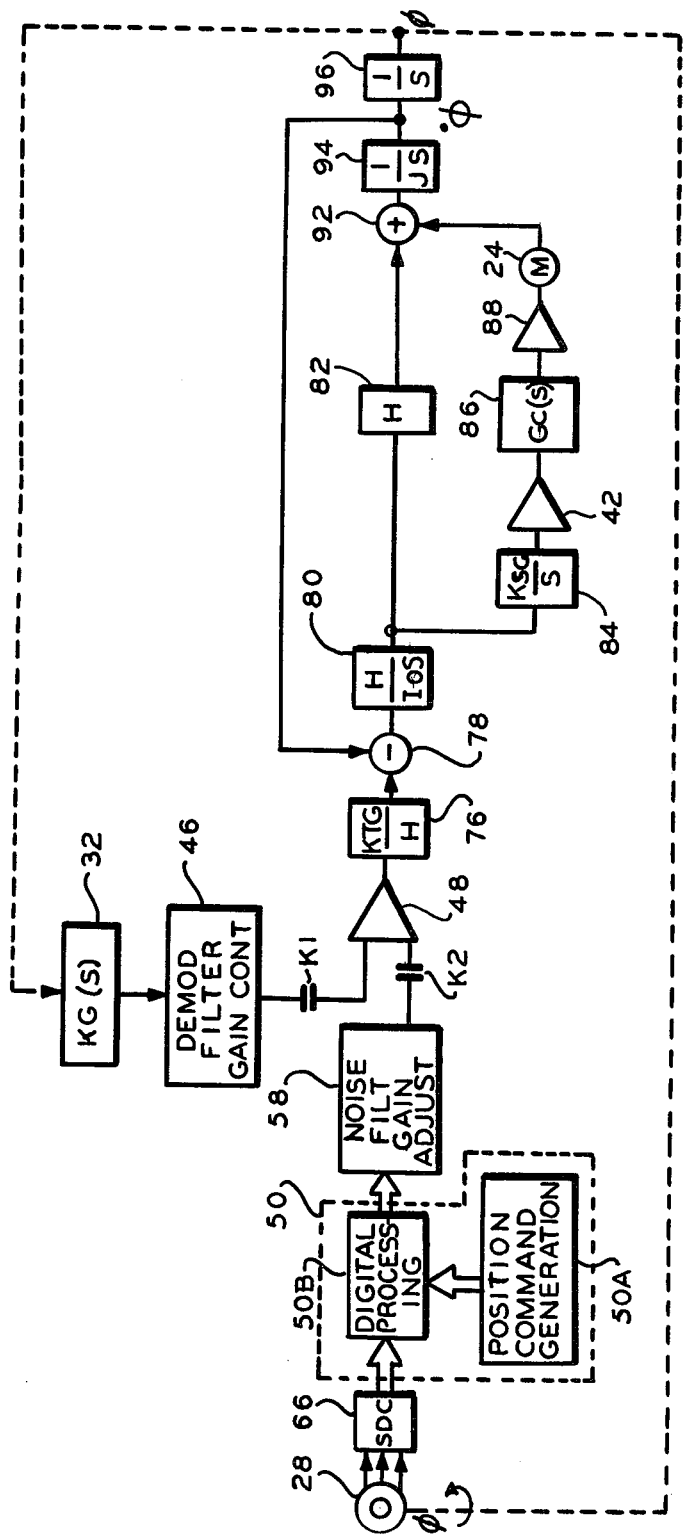
FIG. 2 is a schematic diagram providing a model for the feedback control of the apparatus of FIG. 1.

Before fully describing the operation of the equipment of FIG. 1, it is useful to describe specifically how rotation about the upright axis of pivot 22 is accomplished by signals from the amplifier 48. To this end, a feedback flowchart illustrated in FIG. 2 shows previously described synchro transmitter 28 transferring its signal through synchro to digital converter 66 to microcomputer 50. Microcomputer 50 is shown having internally generated position command functions 50A under control of the program. The hardware processing the digital commands is shown herein as block 50B which applies an output signal through previously mentioned filter 58 and contact K2. The previously identified level sensor 32 is shown with a mechanical input and having a transfer function KG(s) in the Laplace domain. Sensor 32 drives previously mentioned demodulator/filter 46, the latter setting the loop gain through level sensor 32. Again, the output of circuit 46 can couple through contacts K1 to the input of the amplifier 48.

The foregoing recapitulated connections previously illustrated in FIG. 1 which were arranged to produce signals from amplifier 48. The balance of the apparatus shown in FIG. 2 concerns transfer functions associated with gyroscope 34 (FIG. 1) and how they affect rotation of gimbal 18. The angular rotation of gimbal 18 is defined herein as angle $\phi$ associated with the dotted, mechanical function lines. Thus amplifier 48 is shown driving a block 76 having a transfer function KTG/H. The term KTG is the scale factor for the torquer 65 on output axis OA2 of gyroscope 34 (FIG. 1). The term H is the momentum of the spinning element within that gyroscope. Block 76 drives one input of a difference junction 78 whose output is transferred through a block 80 having a transfer function $H/I_0 s$. The term $I_0$ is the moment of inertia of the spinning element about the output axis OA2, the term s being the familiar Laplace variable. The output of block 80 feeds two forward paths, one path comprising block 82 which scales the signal according to the momentum H of gyroscope 34. The second forward path includes a block 84 having a Laplace transfer function $K_{sg}/s$. The term $K_{sg}$ is a scale factor for the signal generator within gyroscope 34 (FIG. 1) driving line OA2 and indicating rotation about the output axis. Block 84, operating through previously identified amplifier 42, drives block 86 having a transfer function Gc(s), a term generally indicating a transfer function in the Laplace domain. Block 86 is shown driving output amplifier 88 and motor 24 to indicate the power boosting, scaling and mechanical conversion associated with the previously described motor. The outputs of motor 24 and block 82 are summed at junction 92 to drive a block 94 whose transfer function is 1/Js, term J indicating the moment of inertia about the upright axis (pivot 22 of FIG. 1). The output of block 94 is shown as a first time differential $\dot{\phi}$ and this signal is shown being fed back to a separate input of differential junction 78 and fed forward to integrator block 96, the latter producing the mechanical effect, angular rotation $\phi$ about the upright axis (pivot 22 of FIG. 1).

The foregoing described a mathematical model of the gimbal and how it rotates about an upright axis (pivot 22 of FIG. 1) in response to signals from amplifier 48. This model takes into account moments of inertia about the upright axis and about the output axis of the gyroscope. Also considered is the angular momentum of the gyroscope. While the system response has the foregoing complexity, in general an output signal from summing amplifier 48 eventually applies a signal to the input of integrator 96. Accordingly, a signal produced by amplifier 48 will rotate gimbal 18 and thus change angle $\phi$. If contacts K2 are closed, processor 50 can effect such gimbal rotation $\phi$ and alter the positioning of synchro 28 thereby changing the feedback through converter 66 and alerting processor 50 of the gimbal response. Similarly, an error signal from level sensor 32 indicating the upright axis is not truly vertical (pivot 22 of FIG. 1), can cause gimbal rotation $\phi$ if contacts K1 are closed. In this embodiment, either contacts K1 or K2 are closed but never both at once.

Accordingly, processor 50 can initiate gimbal rotation $\phi$ and wait until the gimbal reaches a desired position before interrupting a rotation command. Processor 50 can effectively direct gimbal 18 (FIG. 1) into any desired position. Furthermore, level sensor 32 is part of a closed feedback loop. In effect, the level sensor 32 causes gimbal 18 (FIG. 1) to rotate until the level sensor is nulled. This nulling would correspond to inner axis 16 (FIG. 1) being horizontal, at which time the outputs of elements 48 and 94 are zero. The foregoing feedback loops are not only controlled on a long term basis (by either level sensor 32 or processor 50) but are also stabilized on a short term basis by gyroscope 34. Since gyroscope 34 has its input axis approximately parallel to the upright axis (pivot 22 of FIG. 1), this gyroscope can quickly respond to high speed transients tending to deflect it and its gimbal 18.

To facilitate an understanding of the principles associated with the foregoing apparatus, its operation now will be briefly described. It is assumed that gimbal 18 (FIG. 1) is randomly oriented initially and is not aligned with north. Microcomputer 50 initiates action by closing contacts K1, keeping contacts K2 open. Consequently, a feedback path exists through level sensor 32, conditioning circuit 46 and directional gyroscope 34 to motor 24 (FIGS. 1 and 2). Therefore, in the manner just described in connection with FIG. 2, level sensor 32 causes gimbal 18 to rotate under the influence of motor 24. This rotation continues until level sensor 32 is nulled, when inner axis 16 is horizontal. Once inner axis 16 reaches this level position, motor 24 ceases rotating gimbal 18. After stopping in this first position, platform 14 (FIG. 1) is then kept horizontal by level sensor 36 so that spin axis SA1 is also horizontal. If platform 14 tilts, level sensor 36 couples an error signal through circuits 38 and 40 to apply a torque by torquer 12 to gyro 10. Gyro 10 in turn applies a correcting signal on line OA1 to amplifier 44 and torquer 20. This feedback drives platform 14 to a level position. Since gyro 10 is within this feedback loop and has its input axis nominally parallel to inner axis 16, this loop is gyro stabilized against high speed transients tending to unlevel platform 14. Therefore, gimbal 18 and platform 14 have positioned themselves so that spin axis SA1 and input axis IA1 of gyro 10 are both horizontal. Consequently, the output axis of gyro 10 is vertical.

Under these circumstances, the torques on gyro 10 balance and gyro 10 can be operated as a rate sensor for measuring the horizontal component of the rotation of the earth. Once gimbal 18 and platform 14 have been properly positioned, the residual torque from torquer 12, required to keep the float within gyro 10 in a null or neutral position is a signal proportional to the horizontal component of earth's rotation along input axis IA1. This signal appears at the junction of torquer 12 and amplifier 40.

Figure 4:
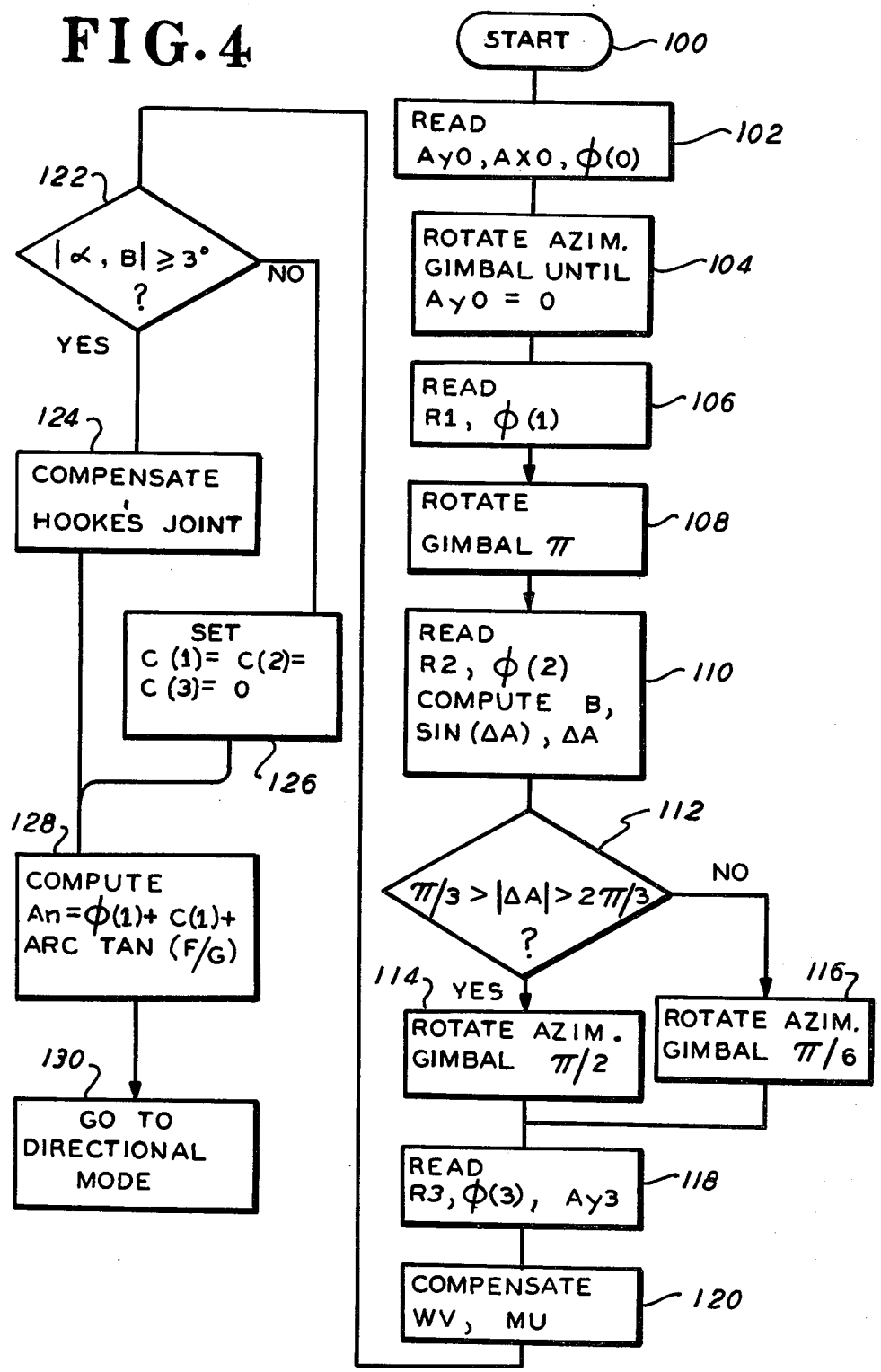
FIG. 4 is a flowchart showing the control sequence for the apparatus of FIG. 1.

The foregoing steps are also charted in the flowchart of FIG. 4 showing microcomputer steps commencing with start step 100 and progressing to step 102 where input data is read. Specifically, initially read quantities Ay0, Ax0 and $\phi(0)$, are the readings of transducers 32, 30 and 28, respectively, before the microcomputer 50 rotates gimbal 18 (FIG. 1) into the position wherein level sensor 32 is nulled. Step 104 indicates the rotation of gimbal 18 until inner axis 16 is level and level sensor 32 is nulled. Step 106 shows rereading of the synchro 28 to obtain the first angular position of gimbal 18, identified herein as $\phi(1)$. Also in step 106, the input to torquer 12 is measured as reading R1.

Figure 3:
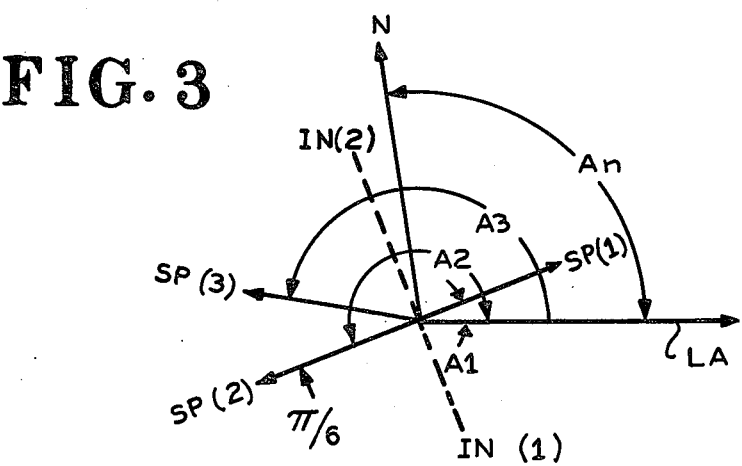
FIG. 3 is a vector diagram associated with the apparatus of FIG. 1.

The physical processes involved herein can be better understood by reference to FIG. 3 showing the direction of the longitudinal axis of the vehicle in which the apparatus of FIG. 1 is mounted, as vector LA. The orientation of the spin axis of gyroscope 10 after it has been rotated into its first horizontal position is shown herein as vector SP(1) which makes an angle A1, with respect to the longitudinal axis LA. Of course, the input axis of gyroscope 10 is orthogonal to the spin axis and is shown herein for this initial position as residing along line IN(1). The direction of north is shown by vector N which makes an angle An with longitudinal axis LA. It is apparent from the foregoing that the rate reading R1 obtained from torquer 12 of gyroscope 10 in this first position can be calculated according to the following equation:

$$R1 = -Wh \sin(An - A1) + B \qquad (1)$$

wherein Wh is the horizontal component of the earth's rotation and B is a bias term inherent in the gyroscope. In the event the upright axis through pivot 22 of gimbal 18 is not vertical, then the angle $\phi$ measured by synchro transmitter 28 will not correspond identically to the azimuthal angle A1. Accordingly, the actual angle A1 may be related according to the following formula:

$$A1 = \phi(1) + C(1) \qquad (2)$$

wherein angle $\phi(1)$ is the angle measured in the first position by synchro transmitter 28 and term C(1) is a correction factor derived according to the familiar Hooke's joint equation. One simplified expression of the Hooke's joint correction appears as follows:

$$C(n) = [\tfrac{1}{2} \sin \phi(n) \cos \phi(n)][\alpha^2 - \beta^2] + \alpha\beta \cos^2 \phi(n) \qquad (3)$$

wherein angles $\alpha$ and $\beta$ are the roll and pitch, respectively, of the vehicle about the longitudinal axis LA (FIG. 3). The parenthenical variable n is simply an index of the successive positions at which the terms such as C(1) are calculated.

The next step, as indicated by block 108 in the flow chart of FIG. 4, is rotation of gimbal 18 by 180 degrees. Referring to FIG. 3, this rotation is shown as a repositioning of the spin axis along vector SP(2) so that the input axis of gyroscope 10 is along line IN(2). Accordingly, the second rate reading, R2, may be expressed as follows:

$$R2 = -Wh \sin(An - A2) + B \quad (4)$$

wherein angle A2 is illustrated in FIG. 3 as the angular spacing between longitudinal axis LA and the spin axis SP(2) in the second position. Like equation 2, the angle A2 may also be expressed as the sum of the synchro angle $\phi(2)$ in the second position and the corresponding Hooke's joint correction C(2). Since the angle A2 is the sum of angle A1 plus $\pi\delta1$ (wherein $\delta1$ is $\pm1$ depending upon the direction of rotation) equation 4 may be expressed in terms of angle A1 as follows:

$$R2 = Wh \sin(An - A1) + B \quad (5)$$

Combining equations 1 and 5, the following expression is obtained:

$$B = \frac{R1 + R2}{2} \quad (6)$$

Similarly, the value of the transcendental function in equations 1 and 5 may be evaluated as follows:

$$F = \sin(An - A1) = \frac{R2 - R1}{2Wh} \quad (7)$$

function F being used to identify the transcendental function. The above equation may be solved directly for the argument of the transcendental function or, more conveniently, be rearranged by substituting the value of bias B (equation 6 and 7) to arrive at the following:

$$\Delta A = An - A1 = \arccos\left(\frac{R2 - B}{Wh}\right) \quad (8)$$

However, an ambiguity exists since the trigonmetric sine function has multiple angular values once amplitude is specified. In any event, the foregoing processes are indicated by step 110 of FIG. 4 indicating the reading of the torque value R2 and synchro reading $\phi(2)$. Further illustrated in step 110 is: computation of bias B, the trigonmetric quantity sin $\Delta A$ and the ambiguous difference angle $\Delta A$.

It is now desirable to rotate the spin axis into a third position which is not aligned with north so that a substantial rate reading can be obtained and so that the ambiguity discussed above can be resolved. In this embodiment, gimbal 18 is rotated by an angle $\pi/n$, wherein n is either 6 or 2. The chosen value of n which will avoid alignment with north is as follows:

$$n = \begin{cases} 6\pi/3 \leq |\Delta A| \leq 2\pi/3 \\ 2\pi/3 > |\Delta A| > 2\pi/3 \end{cases} \quad (9)$$

wherein $|\Delta A| \leq \pi$. This comparison is shown in FIG. 4 as logical branch point 112, followed by alternate commands 114 and 116. Subsequently, a third rate reading R3, a level signal Ay3 and a synchro reading $\phi(3)$ are obtained as shown in step 118. It will be appreciated from the foregoing, that other angles of rotation are possible for this third position of gimbal 18, but the above is chosen as a matter of convenience. The foregoing rotation will ensure that the third position of gimbal 18 displaces the spin axis of gyroscope 10 from north by at least 30 degrees. Taking into account the fact that in this chosen third position, the upright axis through pivot 22 (FIG. 1) may be tilted from vertical, the third rate reading R3 may be expressed as follows:

$$R3 = -Wh \sin(An - A3) \cos(\arcsin Ay3) + B + T \quad (10)$$

wherein the term T will be defined presently. In the example of FIG. 3, the third angle A3 is illustrated as a negative displacement of $\pi/6$ since $\Delta A$ is greater than 60° and less than 120°. This negative direction is arbitrary. The above cosine term takes into account the fact that the horizontal component of the earth's rate may not be fully projected onto the input axis of gyroscope 10. This incomplete projection is caused by tilting of the upright axis (pivot 22 of FIG. 1) and input axis IA1 as measured by level sensor 32 to produce the tilt signal Ay3. The correction T, shown as step 120 in FIG. 4, takes into account significant errors caused by projection of the vertical component of earth's rate of rotation onto the input axis of gyroscope 10 as well as apparent torques produced by the mass unbalance within gyroscope 10 when its output axis is not precisely vertical. These corrections may be expressed as follows:

$$T = Ay3(Wv + MU) \quad (11)$$

wherein Wv is the local vertical rate of earth's rotation and wherein MU is a term accounting for the mass unbalance in gyroscope 10. Since the displacement between the second and third position is known, one can be expressed in terms of the other. The correction for Hooke's joint, a significant consideration when the upright axis of pivot 22 is not vertical, can also be included to develop a general angular relation between the second and third position. Accordingly, the actual angle A3 of the spin axis can be expressed as follows:

$$A3 = A2 - C(2) + \pi/n\delta2 + C(3) \quad (12)$$

wherein the terms C(2) and C(3) are the corrections of Hooke's joint according to equation 3 and term $\delta2$ is $\pm1$, again depending upon the direction in which gimbal 18 is rotated to arrive at the third position. Since angle A2 exceeds angle A1 by $\pi\delta1$, angle A3 may be expressed as follows:

$$A3 = A1 + \pi\delta1 + \pi/n\delta2 + C(3) - C(1) \quad (13)$$

The foregoing expression for angle A3 can be substituted into equation 10 to show the complete equation for determining reading R3. However for roll and pitch which do not exceed $\pm3°$ (the decision of branch 122 and steps 124 and 126) correction terms C(3) and C(1) and level sensor output Ay3 may be set equal to zero to obtain the following approximate expression:

$$R3 = Wh[\sin(An - A1)\cos \pi/n - \cos(An - A1)\sin \pi/n] + B + T \quad (14)$$

The foregoing is obtained by using the well known identities for factoring difference angles in the argument of a trigonometric function. Equation (14) may be further rearranged as follows:

$$G = \cos(An - Al) = \quad (15)$$

$$\frac{-R3 + Wh \sin(An - Al)\cos\pi/n + B + T}{Wh \sin \pi/6}$$

wherein function G indicates the value of the above trigonometric function. Therefore, function G may be divided into the previously identified function F of equation 7 and using equation 2, obtain the following expression for determining the angle sought:

$$An = \phi(1) + C(1) + \arctan(F/G) \quad (16)$$

The latter operation is indicated in the flow chart of FIG. 4 as computational step 128. After the foregoing has been performed, microprocessor 50 (FIG. 1) can now indicate the direction of north, with good accuracy. Accordingly, as indicated by step 130 of FIG. 4, computer 50 shifts into a directional mode, opening contacts K1 and closing contacts K2. In this directional mode, computer 50 applies through contacts K2 compensation but the main effect is caused by gyroscope 34 sending azimuthal shifts and producing a signal through amplifier 42. Consequently, gimbal 18 will be rotated by motor 24 in a direction to keep its azimuthal angle the same. It will be appreciated that a moving vehicle (not shown) carrying the apparatus of FIG. 1, may roll and pitch and therefore, cause input axis IA2 of gyro 34 to produce erroneous readings.

Figure 5:
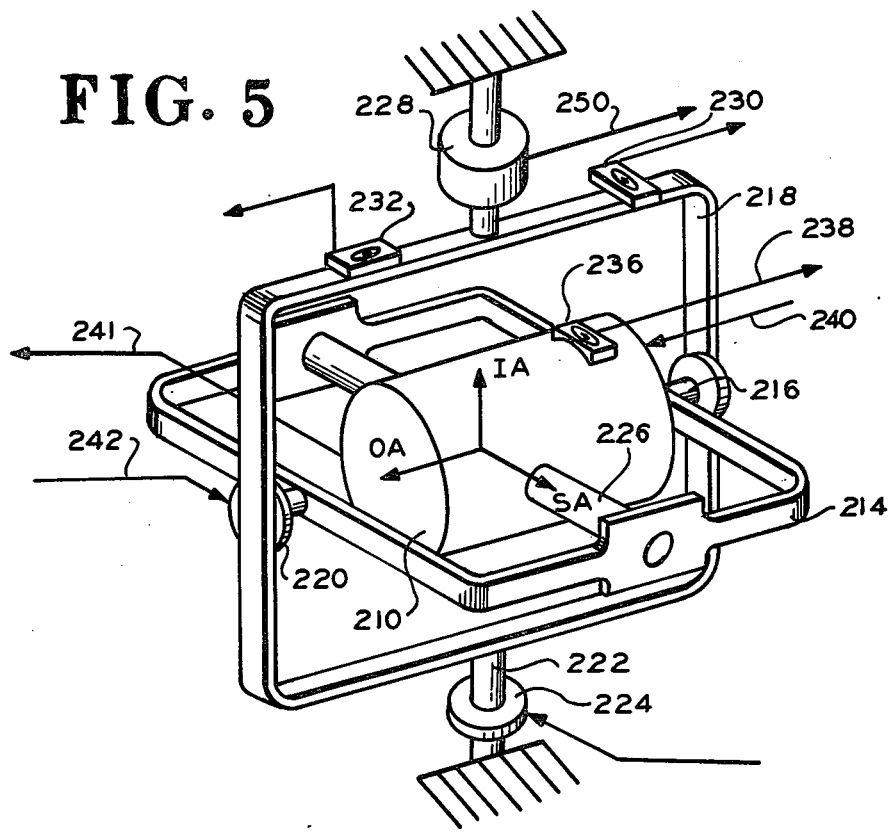
FIG. 5 is a schematic diagram showing a gyrocompass which is an alternate to that shown in FIG. 1.

An alternate embodiment is illustrated in FIG. 5. This embodiment employs a gimbal 218 mounted on an upright axis 222 and containing on an inner axis 216, an inner gimbal or platform 214. Inner gimbal 214 supports a dual function gyroscope 210 which is shown supported on an axle 226 which is nominally parallel to spin axis SA of gyroscope 210. The output axis of gyroscope 210 is parallel to inner axis 216 and input axis IA is orthogonal to spin axis SA and output axis OA. Level sensor 236, mounted on gyro 210, indicates the extent of deviation of platform 214 from horizontal. The output of level sensor 236 is illustrated as line 238. Again, gyroscope 210 has an input applied along line 240 to a torquer internal to gyroscope 210. Similarly, an output line 241 from gyroscope 210, indicates deflection of the float therein from a neutral position. Furthermore, torquer 220 operating on inner axis 216, can cause relative rotation of platform 214 with respect to gimbal 218 in response to signals along line 242. Mounted on gimbal 218 are a pair of orthogonal level sensors 230 and 232. A gimbal motor 224 driving upright axis 222 can rotate gimbal 218 which rotation is sensed on line 250 from transducer 228.

The foregoing is analogous to the gimbal system and gyrocompass shown in FIG. 1. In fact, elements 210, 218, 220, 222, 224, 228, 230, 232, 236, correspond to elements 10, 18, 20, 22, 24, 28, 30, 32, 36 of FIG. 1. A significant difference, however, is that there is only one gyroscope shown in FIG. 5. However, in this embodiment gyroscope 210 is rotatable by 90 degrees about axle 226 to shift input axis IA of gyroscope 210 from the illustrated vertical position to a horizontal position. Of course, when the input axis is vertical, gyroscope 210 can operate as a directional gyroscope and when the input axis is horizontal, it can act as a gyrocompass. Thus it will be appreciated that the equipment of FIG. 5 can be operated in a manner similar to that previously described in connection with FIG. 1, except that the transition from a gyrocompass to a directional mode is marked by the rotation by 90 degrees of gyroscope 210.

It is to be appreciated that various modifications may be implemented with respect to the above described preferred embodiments. For example, the position of various synchro-transmitters and torquers may be transposed depending upon the physical requirements. Furthermore, for a double gyroscope embodiment, the relative position of the two gyros may be altered, it being appreciated that the schematic of FIG. 1 is simplified and a practical embodiment will be different and more complex. Also in some embodiments both single degrees of freedom gyros (or the two position, rotatable gyro of FIG. 5) will be replaced by one two degree of freedom gyro. This gyro will have orthogonal input axes that can provide the functions provided by the gyros of FIGS. 1 and 5. In some embodiments, the position at which the various level sensors are mounted can be changed depending upon the clearance and the effect on balance. Also, while various filters, demodulators, and signal conditioners and amplifiers are illustrated, it will be appreciated that in some embodiments, their function may be performed by microprocessor 50. Also, the sequence of executing various processor steps may be reordered depending upon the application. Furthermore, the time at which various calculations are performed, may be advanced or retarded depending upon the need for the information. Also, while specific equations are shown above, these may be simplified or rearranged depending upon the desired accuracy and speed of the system. In addition, the materials employed and the shapes used for the various components may be altered depending upon the desired weight, speed, accuracy, balance, power requirement, strength, etc. Moreover, various circuits employing different processors, and different combinations of digital and analog circuitry may be substituted for what is shown depending upon the desired speed, accuracy, temperature, stability, etc.

Obviously, many modifications and variations of the present invention are possible in light of the above teachings. It is therefore to be understood that within the scope of the appended claims, the invention may be practiced otherwise than as specifically described.

What is claimed is:

1. A gyrocompass comprising:
    a gimbal rotatable about an upright axis;
    a gyro rotatably mounted in said gimbal about an inner axis transverse to said upright axis;
    level sensing means supported by said gimbal for providing a level signal signifying tilting of said upright axis about a tilt axis orthogonal to both said upright and inner axes;
    control means connected to said level sensing means and including means responsive to said level signal for rotating said gimbal into an initial position at which said level signal has a predetermined value; and a level sensor mounted on said gyro and connected to said control means for providing thereto a horizontal signal signifying the extent of alignment of the spin axis of said gyro with horizontal.

2. A gyrocompass according to claim 1 wherein said predetermined value of said level signal corresponds to substantially no tilting of said upright axis with respect to said tilt axis when said gimbal is in said initial position.

3. A gyrocompass according to claim 1 wherein said gyro comprises:
a case;
a spinning element mounted in said case with a single degree of freedom about an output axis transverse to the spin axis of said spinning element;
a torquer mounted in said case and connected to said control means for applying torque to said spinning element about said output axis; and
a transducer mounted in said case for providing a deflection signal signifying the extent of rotation of said element about said output axis from a neutral position.

4. A gyrocompass according to claim 3 wherein the spin axis of said spinning element is orthogonal to said inner axis, further comprising:
a level sensor mounted on said gyro and connected to its torquer for influencing said deflection signal; and
inner torquing means connected to said transducer of said case for stably rotating the latter about the inner axis to level the spin axis of said spinning element.

5. A gyrocompass according to claim 4 wherein said control means applies to said torquer a torque signal tending to drive said spinning element toward said neutral position.

6. A gyrocompass according to claim 5 further comprising:
a gimbal torquing means mounted on said gimbal and responsive to an indexing signal provided by said control means to rotate said gimbal about its upright axis, said control means being operable to produce said indexing signal and drive said gimbal to said initial position and to an antipodal position, substantially antipodal to said initial position.

7. A gyrocompass according to claim 6 wherein said control means is operable to store and apply to a predetermined formula the two respective values of said torque signal when said gimbal is in said initial and antipodal position.

8. A gyrocompass according to claim 7 wherein said two respective values of said torque signal are linearly combined to calculate the bias of said gyro.

9. A gyrocompass according to claim 8 wherein at least one of said two respective values of said torque signal are applied by said control means to a given trigonometric formula to estimate the north to south direction and wherein said control means is operable to rotate said gimbal to a third position between said initial and antipodal position, said third position being angularly spaced from said north to south direction by a predetermined minimum.

10. A gyrocompass according to claim 9 wherein said control means is operable to apply the value of said torque signal to a predetermined equation to determine the north to south direction when said gimbal is in said third position.

11. A gyrocompass according to claim 10 further comprising:
the level sensor mounted on said gyro and connected to said control means and said torquer in said gyro for providing to both said torque signal, said torque signal signifying the extent of alignment of the spin axis of said spinning element with horizontal; and
the inner torquing means connected to said transducer in said gyro case for rotating said gyro about said inner axis and horizontally aligning the spin axis of said spinning element in response to said torque signal applied to said gyro from said level sensor.

12. A gyrocompass according to claim 11 wherein said level sensing means comprises:
a pair of level transducers for providing a pair of level signals signifying tilting about two orthogonal axes, one being orthogonal to both said upright and inner axes.

13. A gyrocompass according to claim 1, 3 or 12 further comprising:
a directional gyroscope mounted in said gimbal, said gyroscope having internally a single degree of freedom about an output axis parallel to said inner axis.

14. A gyrocompass according to claim 1, 3 or 12 wherein said gyro has internally a single degree of freedom, said gyro being rotatable in a plane parallel to said inner axis to shift said degree of freedom by 90° and change the mode of its operation to directional.

15. A gyrocompass according to claim 10 wherein said predetermined equation includes a correction for Hooke's joint and for mass unbalance.

16. A method for determining north with a level sensor mounted on a gimbal rotatable about an upright axis and rotatably supporting a gyroscope about an inner axis transverse to said upright axis, the level sensor oriented for indicating tilting of said upright axis about a tilt axis orthogonal to both said upright and inner axes, comprising the steps of:
rotating said gimbal until said level sensor indicates said inner axis is horizontal;
measuring the torque applied to said gyroscope by the horizontal component of rotation of the earth with the spin axis of said gyroscope rotated about said inner axis into a horizontal position;
rotating said gimbal 180°; and
remeasuring the torque applied to said gyroscope by the horizontal component of rotation of the earth with the spin axis of said gyroscope rotated about said inner axis into a horizontal position.

17. A method according to claim 16 further comprising the step of:
applying the torques measured and remeasured to a predetermined formula to estimate the north to south direction.

18. A method according to claim 16 further comprising the step of:
linearly combining the values of torque measured and remeasured to calculate the bias of said gyro.

19. A method according to claim 16 further comprising the steps of:
applying the torques measured and remeasured to a given trigonometric formula to estimate the north to south direction; and
rotating said gimbal to a third position angularly spaced from said north to south direction by a predetermined minimum.

20. A method according to claim 19 comprising the steps of:
measuring the torque applied at said third position to said gyroscope by the rotation of the earth with the spin axis of said gyroscope rotated about said inner axis into a horizontal position; and
applying the torque measured with the gimbal in said third position to a predetermined equation to determine the north to south direction.

21. A method according to claim 19 wherein said predetermined equation corrects for Hooke's joint and mass unbalance.

* * * * *